United States Patent
Abdullah Ali et al.

(10) Patent No.: US 11,598,358 B2
(45) Date of Patent: Mar. 7, 2023

(54) METHOD FOR CREATING A PRESS CONNECTION ARRANGEMENT, PRESS CONNECTION ARRANGEMENT AND METHOD FOR CREATING A CLAMPING CONNECTION AS WELL AS THE CLAMPING CONNECTION ITSELF AND THE USE THEREOF

(71) Applicant: GEHRING TECHNOLOGIES GMBH, Ostfildern (DE)

(72) Inventors: Fares Gamal Abdullah Ali, Darmstadt (DE); Matthias Weigold, Hirschberg (DE); Gerhard Flores, Ostfildern (DE); Tobias Thom, Remshalden (DE); Tobias Wagner, Denkendorf (DE)

(73) Assignee: GEHRING TECHNOLOGIES GMBH, Ostfildern (DE)

( * ) Notice: Subject to any disclaimer, the term of this patent is extended or adjusted under 35 U.S.C. 154(b) by 149 days.

(21) Appl. No.: 16/849,016

(22) Filed: Apr. 15, 2020

(65) Prior Publication Data
US 2020/0325922 A1   Oct. 15, 2020

(30) Foreign Application Priority Data
Apr. 15, 2019 (DE) ............ 10 2019 109 921.8

(51) Int. Cl.
| F16B 7/02 | (2006.01) |
| B23K 26/00 | (2014.01) |
| B23P 11/00 | (2006.01) |
| F16D 1/08 | (2006.01) |
| F16D 1/092 | (2006.01) |

(52) U.S. Cl.
CPC ............ *F16B 7/02* (2013.01); *B23K 26/0093* (2013.01); *B23P 11/00* (2013.01); *F16D 1/0852* (2013.01); *F16D 1/092* (2013.01)

(58) Field of Classification Search
CPC ........ F16B 7/02; F16B 4/004; B23K 26/0093; B23P 11/00; B23B 2231/028; B23B 2260/092; B23B 31/005; B23B 31/117; B23B 31/16275; F16D 2250/0038; F16D 1/0852; F16D 1/092
See application file for complete search history.

(56) References Cited

U.S. PATENT DOCUMENTS 2,407,083 A * 9/1946 Koppel ................ B23K 37/053
                                                  279/74
4,726,719 A * 2/1988 Mack .................... B23B 31/005
                                                  279/123

(Continued)

FOREIGN PATENT DOCUMENTS

| DE | 19614328 A1 | 10/1997 |
| DE | 102009050626 A1 | 4/2011 |

(Continued)

OTHER PUBLICATIONS

Non-translated German Office Action, dated Nov. 18, 2019. pp. 1-7.

*Primary Examiner* — Ryan J. Walters
(74) *Attorney, Agent, or Firm* — George Mcguire (57) ABSTRACT

The invention relates to a method for creating a press connection arrangement and a clamping connection, the method including a plurality of steps, as well as a press connection arrangement and a clamping connection per se.

8 Claims, 6 Drawing Sheets

(56) References Cited

U.S. PATENT DOCUMENTS

5,192,086 A * 3/1993 Bucks .................. B23B 31/204
279/4.09
9,242,325 B2 * 1/2016 Schraeder .............. B23Q 3/183

FOREIGN PATENT DOCUMENTS

| DE | 102011005408 A1 * | 9/2012 | ............. B23P 11/00 |
| DE | 102011005408 A1 | 9/2012 | |

* cited by examiner

METHOD FOR CREATING A PRESS CONNECTION ARRANGEMENT, PRESS CONNECTION ARRANGEMENT AND METHOD FOR CREATING A CLAMPING CONNECTION AS WELL AS THE CLAMPING CONNECTION ITSELF AND THE USE THEREOF

CROSS REFERENCE TO RELATED APPLICATIONS

The present application relates and claims priority to German Patent Application No. DE10 2019 109 921.8, filed Apr. 15, 2019, the entire contents of which is incorporated herein by reference.

BACKGROUND

The present invention relates in a first aspect to a method for creating a press connection arrangement and in a second aspect to a corresponding press connection arrangement per se and in a third aspect to the use of a press connection arrangement or a clamping connection. In an independent third aspect, the invention relates to a method for creating a clamping connection, and in a fourth aspect to such a clamping connection per se.

The press connection arrangement is created by surface contact of a radially inner component, for example a shaft having a radially outer component, for example a hub.

The clamping connection is created by flat contact of a receptacle with a corresponding shank section.

A method for producing a connection arrangement is known from the prior art, for example from DE 10 2011 005 408 A1. DE 10 2009 050 626 A1 also illustrates a method for producing a connection arrangement.

SUMMARY OF THE INVENTION

The object of the first and second aspects of the present invention is to provide a method for creating a press connection arrangement or such a press connection arrangement per se, the press connection arrangement being detachable and re-producible (connectable) multiple times without that the possibility of transmitting a torque between the connected components decreases between the individual processes for creating the connection. In other words, the highest possible torques should be transferable even when the press connection arrangement is detached and produced repeatedly.

One application of such a connection is, for example, the inclusion of a tool shank in a tool chuck. The tool shank is the radially inner component and the tool chuck is the radially outer component. The radially outer component can therefore also comprise a plurality of sections. The partial sections can be radially spaced from one another, in particular in the state forming the press connection arrangement.

The press connection arrangement according to the invention has an axis of rotation which extends in an axial direction of the press connection arrangement. In the intended operation, the press connection arrangement is rotated about this axis of rotation (for example, a drill rotates in a chuck around the longitudinal axis of the drill in the corresponding operation). A radial direction of the press connection arrangement is orthogonal to the axial direction. An axial, radial direction and a circumferential direction form together a cylinder coordinate system, so that the circumferential direction is locally orthogonal to a plane spanned by the axial and radial direction.

The press connection arrangement is created by creating a non-positive connection by means of a microform connection between a radially inner component (hereinafter also partially referred to as a shaft) having a radially outer contact surface and a radially outer component (hereinafter also partially referred to as an outer component) having a radially inner contact surface.

The corresponding method comprises a plurality of steps:
a) providing the radially inner component with an axially extended and radially outer contact surface which is rotationally symmetrical to an axis of rotation of the shaft. In the present case, axially extended means that the normal vector of the contact surface is directed in the radial direction.
b) providing the radially outer component with an axially extended and radially inner contact surface which is rotationally symmetrical to an axis of rotation of the radially outer component.
c) laser structuring of at least one of the contact surfaces (i.e. the radially inner contact surface of the radially outer component and/or the radially outer contact surface of the radially inner component), wherein a structuring is created with a surface profile or height profile that is point-symmetrical with respect to the respective axis of rotation (the positions on the contact surfaces that are offset by 180° with respect to the axis of rotation are at the same effective distance from the axis of rotation). The entire structuring is preferably correspondingly symmetrical and the corresponding symmetrical surface profile or height profile is thereby formed.
d) non-contact arranging of the inner and outer components to one another in the intended axial relative position. "Intended axial relative positions" are understood to mean the position of the inner and outer components relative to one another in the axial direction that is to be assumed by the two components in the final clamped or pressed state.
e) joining of the press connection arrangement. In this joining process, pressure-stress contacting of the contact surfaces with one another takes place by means of a purely radial joining movement. In other words, the two contact surfaces move in the radial direction and there is no movement in the axial or circumferential direction. This makes it possible for the contact surfaces to be pressed purely in the radial direction and the structuring previously created is not sheared off (by an overlaid axial movement, for example). In the joined state, the axis of rotation of the inner component and the axis of rotation of the outer component match the axis of rotation of the press connection arrangement, in other words, the axes of rotation of the components coincide. The axes of rotation of the components can already coincide after the step of non-contact arrangement in the intended axial relative position. This simplifies the later rotationally symmetrical arrangement of the components with respect to one another. While a symmetrical clamping of the two components with respect to one another is already improved by a point-symmetrical surface profile, it is particularly preferred if the structuring is created with a surface profile that is rotationally symmetrical to the respective axis of rotation (at an axial height, all locations in the circumferential direction have the same effective radial distance from the axis of rotation). As a result, the two components to be joined can be rotated relative to one another in the circumferential direction and placed before the clamping process. This simplifies the connection to be created.

It can be provided that the outer component comprises at least two separate sections (for example spaced apart in the circumferential direction) and which are in particular mutually movable (radially).

The outer component can be designed, for example, as a chuck. For example, the outer component can be designed as a multi jaw chuck.

After the non-contact arrangement of the inner component and the outer component with respect to one another (in the intended axial relative position), the movable sections can be moved towards one another in the radial direction in order to join the press connection arrangement. In other word, in order to bring the two components or the contact surfaces thereof into contact with each other with pressure.

As a result, the corresponding connection between the outer component and the inner component can be created in a very simple manner. As mentioned above, the purely radial joining prevents the structuring from shearing off. As a result, the connection is repeatedly detachable and joinable.

Such a purely radial movement can be implemented particularly easily with an outer component having a plurality of movable partial sections. In particular, the partial sections can be coupled to one another in such a way that they move radially inward at the same speed during the radially inward movement.

The outer component can be a clamping device. It is conceivable, for example, that the outer component is designed as a tool clamping system. For example, a hydraulic expansion chuck, a jaw chuck, a collet or a thermal chuck is conceivable.

In the method according to the invention, the surface of the contact surface of the outer component is moved in the radial direction. Locally, the surface of the contact surface typically extends orthogonally to the radial direction. The contact surface of the outer component is typically curved, so that the orthogonal arrangement of the contact surface relates to the respective local tangent.

The inner component can be a tool shank. The at least one contact surface which has been structured by laser machining can be arranged on the tool shank.

It can therefore be provided that the press connection arrangement comprises a clamping device in the form of a tool clamping system, the contact surfaces of the clamping device being unstructured and the inner component being a tool shank, and the contact surface of the tool shaft being structured accordingly by laser machining.

In general, it can be advantageous if the structuring is applied to the component with the harder surface. The shank of a hard metal tool can for example be structured and arranged in a hardened chuck.

In the structured area, the structured component can consist of a solid, that is to say void-free, material. The presence of voids in the structured area can have a negative effect on the achievable quality of the structure and also impair the stability thereof.

The respective structuring can include warps. The warps each have a certain height. The maximum height of the warps created by the structuring can be 25 micrometers, in particular 20 micrometers, in particular 15 micrometers, in particular 10 micrometers, in particular 5 micrometers. The amount of the warps does not exceed this value. Such an upper limit for the height of the warps improves the detachability of the connection created, since the warps and the entire structuring are only minimally or not plastically preformed during joining. The height is seen as the radial distance from the radially outer point of an elevation ("mountain peak") to the radially inner point ("valley") lying between two radial maxima. Warps with a height between 1 and 5 micrometers can be advantageous.

The structuring can comprise line-shaped warps. The line-shaped warps can in particular be designed and arranged to extend in the axial direction. In particular, the line-shaped warps extending in the axial direction allow the absorption of high torques.

The structuring can also include line-shaped warps, wherein the line-shaped warps extend in intersecting lines, in particular the lines enclosing an angle 64 of 75° to 105°.

If in the context of this application reference is made to surface profile, it means the surface defined by the radially outer points (i.e. "mountain peaks"). In other words, the position of the surface without a counterpart deforming the structuring or penetrating into the interstices of the warps by plastic deformation.

A corresponding press connection arrangement (or shaft-hub connection) according to the invention is characterized in that it was created using one of the methods described here.

Typically, in the case of such a press connection arrangement, when microscopically analyzing the surfaces of the two joining partners, it can be seen that there are no traces of so-called seizure (shearing off of warps of the structure or causing furrows in the component which has no structuring).

The penetration of the elevations of the two joining partners into the respective counterpart is also minimal. Ideally, the structures of the two joining partners only hook together (extending orthogonally in a plane to the radial direction). However, it can also be provided that the structuring of one of the joining partners digs into the surface of the other joining partner in the radial direction and leads to a plastic deformation. This is provided in particular if the two components have different surface hardnesses. The structuring of the contact surface can in particular take place or have taken place in such a way that the structured areas are hardened by the structuring.

If the structuring warps dig into the opposite side, the purely radially directed pressing movement leads to the fact that the digging is also carried out only in the radial direction, thereby preventing the warps from being removed and/or deformed. Structure-forming parts such as the warps or the valleys between the warps are retained even when the connection is detached and joined repeatedly. In particular, no removal takes place before the final axial position has been reached and afterwards the actual wedging effect of the structuring can no longer be fully used.

According to the third and fourth aspects of the invention, a method for creating a clamping connection and/or a corresponding clamping connection per se is also provided. When the clamping connection is created according to the invention, it has an axial direction along which an axis of rotation of the clamping connection extends. A radial direction of the clamping connection is oriented orthogonally to the axial direction. The clamping connection has a receptacle with a conical, radially inwardly oriented contact surface. However, this does not mean that the contact surface is arranged strictly orthogonal to the radial direction, as in the case of the press connection arrangement, rather the contact surface in the present case is in the form of a section of a lateral surface of a truncated cone. The clamping connection further comprises a shank section, which in particular can be a tool shank, which has a conical, radially outwardly oriented contact surface. The radially outward oriented contact surface is complementary to the contact surface of the receptacle. The corresponding method for forming the clamping connection comprises the following steps:
a) providing the receptacle with a conical, radially inwardly oriented contact surface;
b) providing the shank section with a conical, radially outwardly oriented contact surface;
c) laser structuring of at least the contact surface of the receptacle, wherein a structuring is created having a surface profile that is point-symmetrical with respect to the axis of rotation (this relates to a section that extends through a plane that is orthogonal to the axis of rotation), in particular with a rotationally symmetrical surface profile. The laser structuring comprises, in particular, line-like elevations extending in a plane spanned by the axial direction and the radial direction;
d) non-contact arranging of the receptacle and the shank section to one another. The arrangement takes place in the intended radial relative position. In other words, the respective components, that is to say the receptacle and the shank section, are no longer moved in the radial direction after the non-contact arrangement in the intended radial relative position. Then in a further step, the clamping connection is joined, with pressure-stress contacting of the contact surfaces with one another by means of an axially directed joining movement. Because the joining movement is directed purely axially, the contact surfaces are pressed purely in the axial direction during the joining. In the assembled state, the axes of rotation of the shank section of the receptacle and the joined clamping connection coincide. For example, the shank section can be pulled or pushed into the receptacle in the axial direction for joining. As already mentioned above, the line-like elevations of the structuring preferably extend in a plane that is spanned by the radial and axial directions. Accordingly, the elevations are not sheared off during joining and can, if necessary, dig into the opposite partner in the axial direction or wedge into the surface thereof. The corresponding connection is often detachable and only slightly modifies the surface of the joining partners.

The object of the present invention according to a fourth aspect is a clamping connection, which relates in particular to an axial chuck. The clamping connection has an axial direction and a radial direction correspondingly arranged orthogonally thereto. The clamping connection comprises a receptacle having a radially inwardly oriented conical contact surface, which corresponds to an outer surface of a truncated cone, and a shank section having a radially outward oriented conical contact surface, which likewise corresponds to the outer surface of a truncated cone. The shank section can in particular be a tool shank. The radially outward oriented contact surface of the tool shank section or tool shank is complementary to the contact surface of the receptacle. The shank section was clamped against the receptacle by axially directed clamping. The clamping connection is now characterized in that the radially inward contact surface of the receptacle is laser structured. The laser structuring has a rotationally symmetrical profile with respect to the axis of rotation. In particular, the laser structuring can comprise line-like structuring. As in the previously described method, these preferably extend in a plane spanned by the axial and radial direction.

The object of the present invention according to a further aspect also relates to the use of a press connection arrangement or a clamping connection according to any of the embodiments described in this application, for the transmission of axial forces and a torque, wherein the axial forces and the torque define a resulting direction of force, wherein the structuring comprises lines extending at an angle between 60° and 120°, in particular 70° and 110°, in particular 80° and 100°, in particular orthogonal, to the resulting direction of force, wherein the structuring comprises intersecting lines resulting in an engagement surface (superimposition of the different directional components of the lines, angle of a line section weighted with the length of the course at this angle), and extending at an angle between 60° and 120°, in particular 70° and 110°, in particular 80° and 100°, in particular orthogonal, to the resulting direction of force.

BRIEF DESCRIPTION OF THE DRAWINGS

Further aspects and details of the present invention are shown in the following drawings and explained in the description of the drawings.

In the drawings.

DETAILED DESCRIPTION

Figure 1:
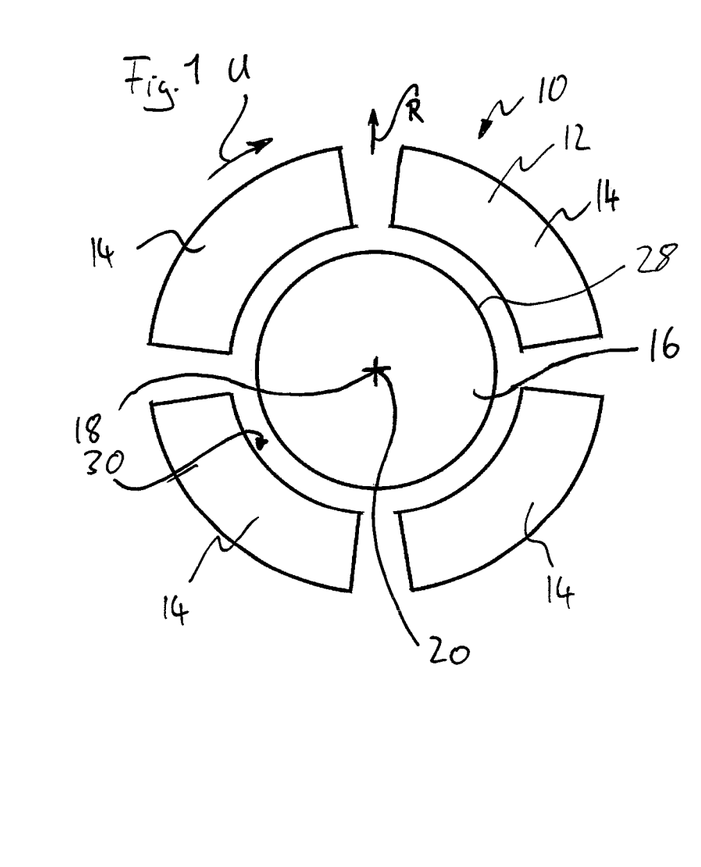
FIG. 1 shows a press connection arrangement in the mutually arranged state of an inner and an outer component before a joining process when looking in the axial direction.
Figure 3:
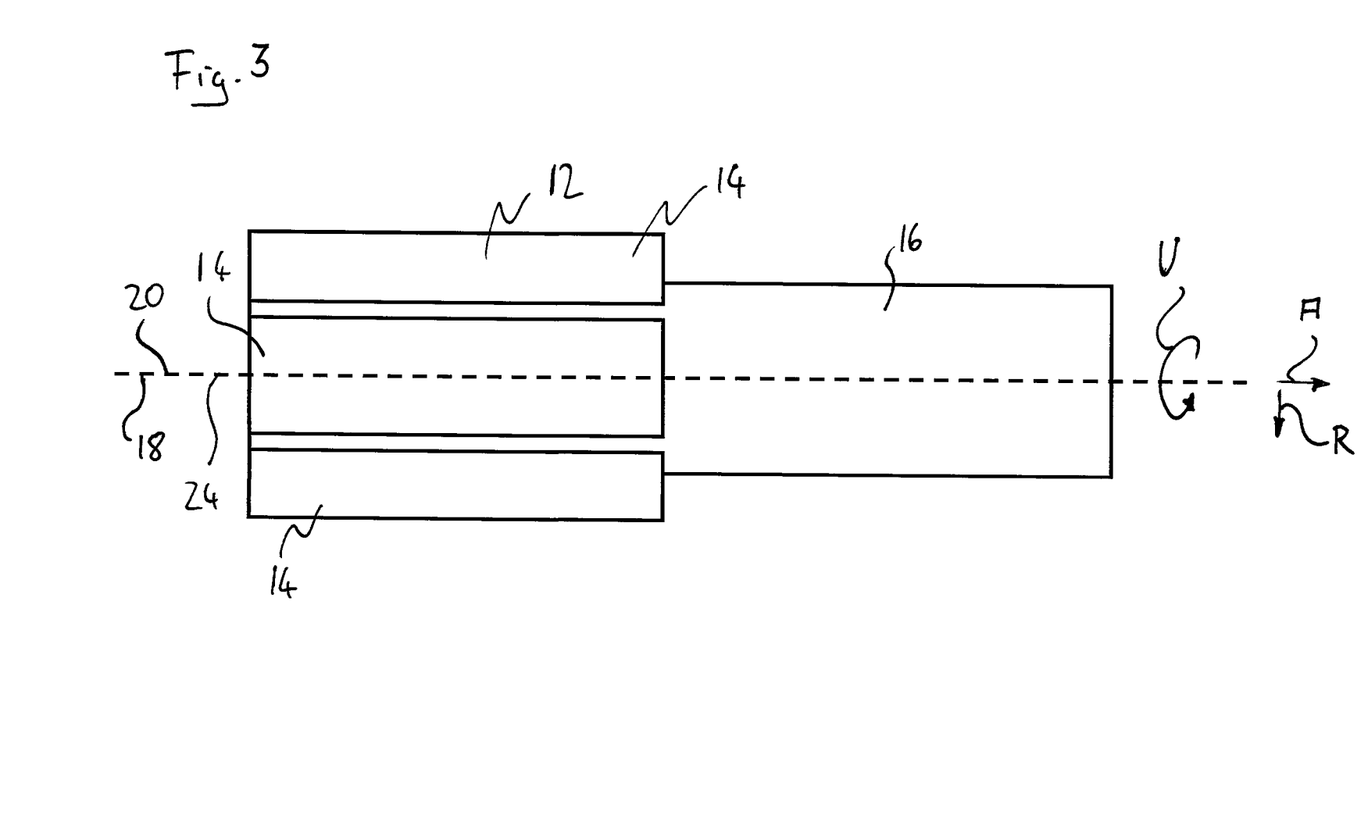
FIG. 3 shows the press connection arrangement in the joined state when looking in the radial direction.

FIG. 1 shows a press connection arrangement 10. A radial direction has the reference symbol R and a circumferential direction has the reference symbol U. An axial direction is illustrated in FIG. 3 with the reference symbol A.

In the state shown in FIG. 1, an inner component 16 and an outer component 12 have not yet been joined together. The outer component 12 comprises four partial sections 14. The partial sections 14 are designed here as chuck sections 14. Together, the chuck sections 14 form the outer component 12. The inner component 16, which in the present example is designed as a tool shank, is arranged centrally to the outer component 12 designed as a chuck. A contact surface 28 of the inner component 16 is structured in the present example, while a contact surface 30 of the outer component 12 is designed unstructured in the present example.

Figure 2:
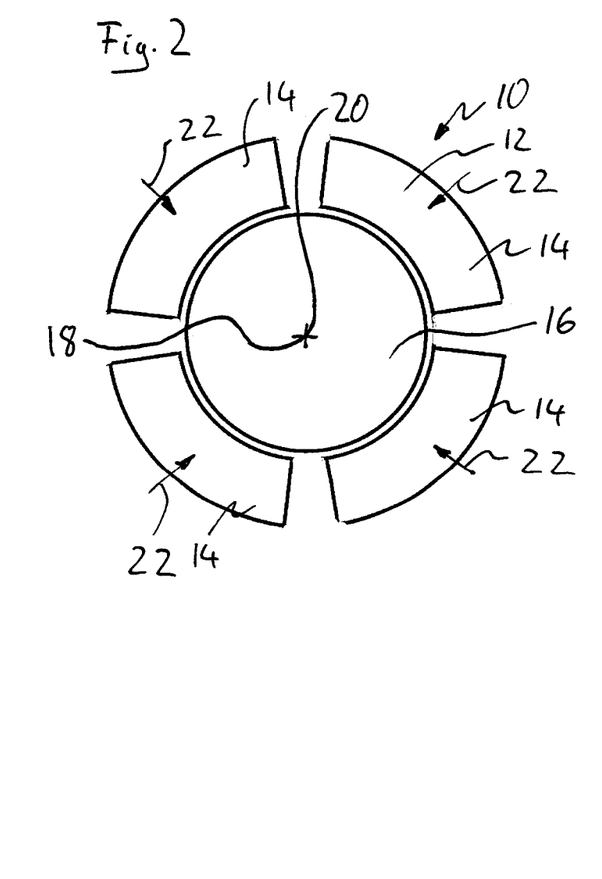
FIG. 2 shows the press connection arrangement during the joining process when looking in the axial direction.

The outer component 12 has an axis of rotation 18 which is arranged to coincide with an axis of rotation 20 of the inner component 16. In order to join and actually create the press connection arrangement 10 capable of power transmission, the sections 14 of the outer component 12 are moved radially inward, which is illustrated by the arrows with the reference symbol 22 in FIG. 2. An axis of rotation 24 of the press connection arrangement 10 is shown graphically in FIG. 3. The joining movement 22 is directed towards this axis of rotation 24.

Figure 4:
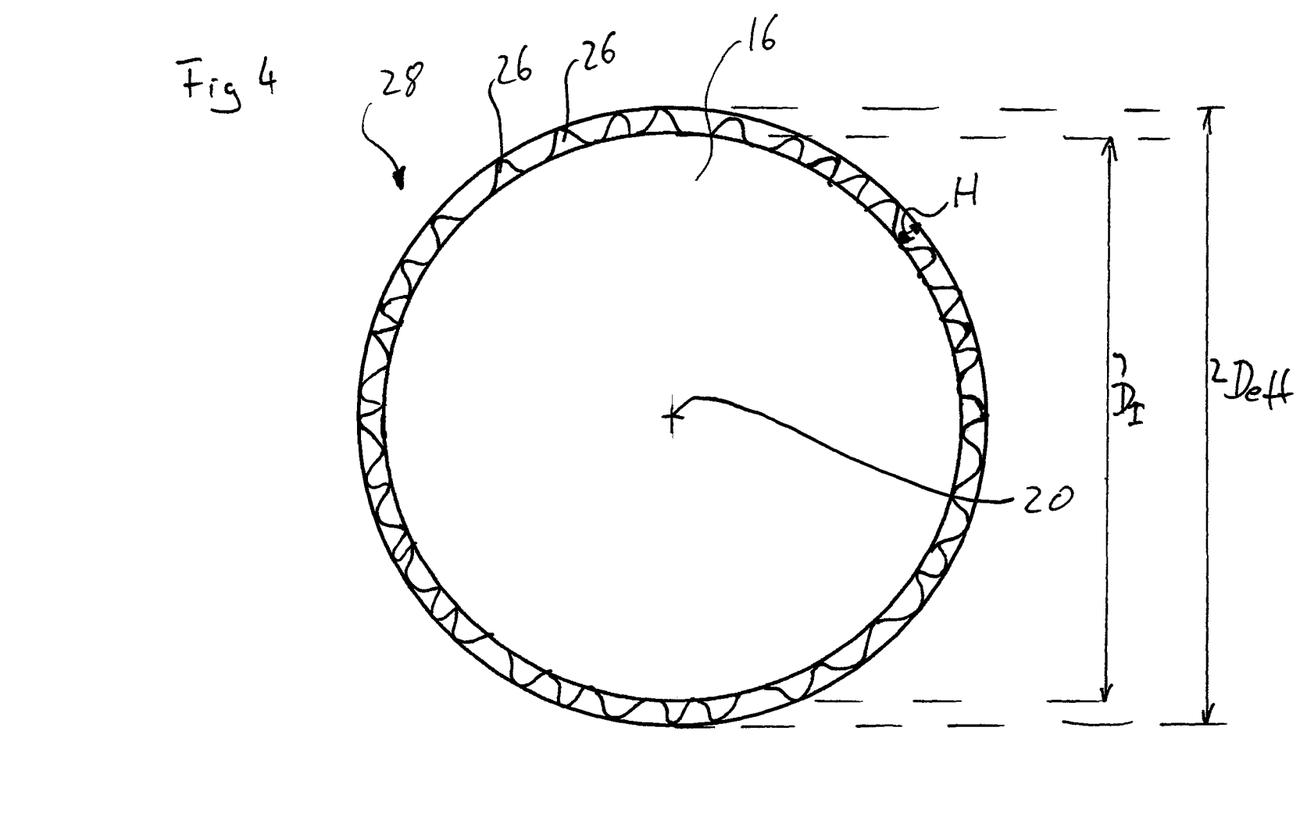
FIG. 4 shows an illustration of the surface profile of the inner component of the press connection arrangement.

FIG. 4 illustrates the surface profile of the structured inner component and shows a section through a plane that is orthogonal to the axis of rotation. In the present case, the surface profile is not only point-symmetrical (in the plane which is orthogonal to the axis of rotation) to the axis of rotation 20 of the inner component 16, but rotationally symmetrical to the axis of rotation 20. Individual elevations of the structuring each have the reference symbol 26. An effective diameter is identified by the reference symbol $D_{eff}$. The reference symbol $D_I$ illustrates the inner diameter of the inner component 16, which corresponds to the diameter of the inner component 16, which is formed by the solid material thereof. The inner diameter does not necessarily have to be point-symmetrical or rotationally symmetrical. Rather, the surface of the inner component 16 enveloping the warps 26 is at least point-symmetrical, but preferably rotationally symmetrical. Rotationally symmetrical configurations of the surface profile of the inner component 16 allow the inner component 16 to be introduced into the outer component 12 regardless of the angle. In the case of a surface profile which is not rotationally symmetrical but point-symmetrical, that is to say a $D_{eff}$ which differs in the circumferential direction, care must be taken to ensure correct alignment of the inner component 16 and the outer component 12.

To create the press connection arrangement 10 from the outer component 12 and the inner component 16, both components are initially provided. Then at least one of the contact surfaces 28, 30 is structured. In the present example, the contact surface 28 of the inner component 16 was structured. The inner component 16 and the outer component 12 were then arranged in the intended axial relative position to one another. In the present example, the two components were also arranged with respect to one another in such a way that their axes of rotation already lie on one another in the non-contact state. This configuration is illustrated in FIG. 1. The arrangement in the intended axial relative position takes place in a non-contact manner in order to avoid damaging the structuring of the contact surface 28 of the inner component 16. Following the corresponding arrangement of the two components to one another, the press connection arrangement 10 was joined. When joining, the contact surfaces 28, 30 are subjected to pressure-stressing contact with one another, this contacting being effected by a purely radial joining movement. The relative movement between the inner component 16 and the outer component 12 was thus purely radial. In the present example, the inner component 16 was held stationary and the chuck sections 14 of the outer component 12 were each uniformly moved radially inwards. The chuck sections 14 of the outer component 12 were moved macroscopically radially inwards. A "macroscopically radially inward movement" is understood to mean a movement which shifts the chuck sections 14 radially inward by means of a mechanical adjustment mechanism. Such a macroscopic shift goes beyond a play of movement, for example through purely thermal deformation processes.

In FIG. 3, the height H of the elevations 26 is identified by a double arrow. Such a height is preferably limited at the top. For example, it has proven to be advantageous for structuring a tool shank if the height H does not exceed a value of 10 µm, in particular 7 µm, in particular 5 µm. This possible upper limit applies to all warps of the surface structuring. It has been shown that such a low structuring is particularly robust against erosion and deformation.

A clamping connection 40 or the individual components thereof is illustrated in FIGS. 5 to 8. The clamping connection 40 is created by using a receptacle 42 having a radially inwardly oriented and conical contact surface 44. The shape of the contact surface 44 corresponds to the lateral surface of a truncated cone. In cooperation with the receptacle 42, the use of a shank section 46, which is preferably designed as a tool shank, is provided to create the clamping connection 40. The shank section 46 has a radially outwardly oriented conical contact surface 48. The two contact surfaces 44 and 48 are designed to be complementary to one another.

Figure 7:
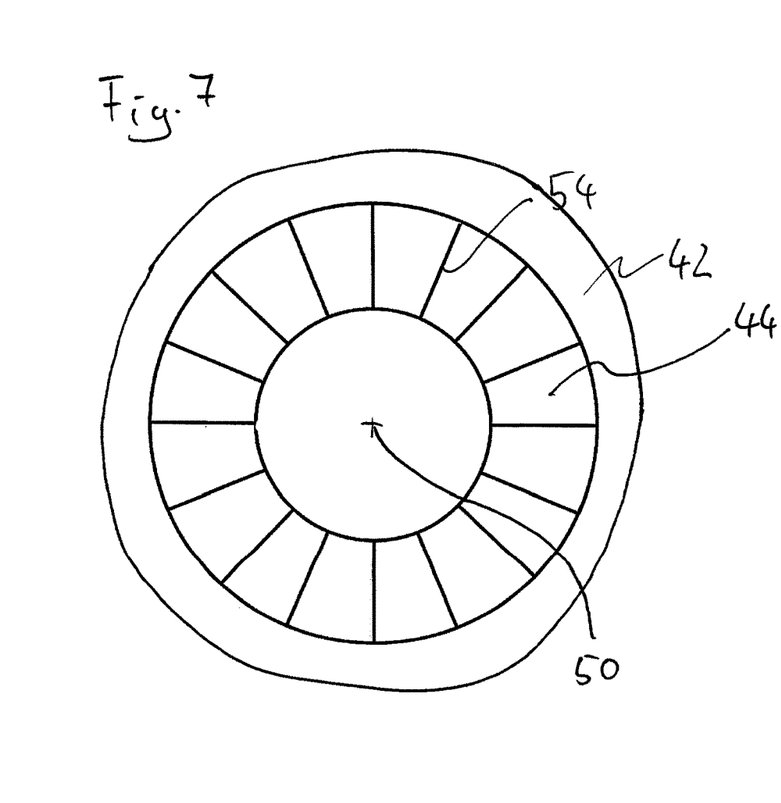
FIG. 7 shows the receptacle of the clamping connection when looking in the axial direction.
Figure 8:
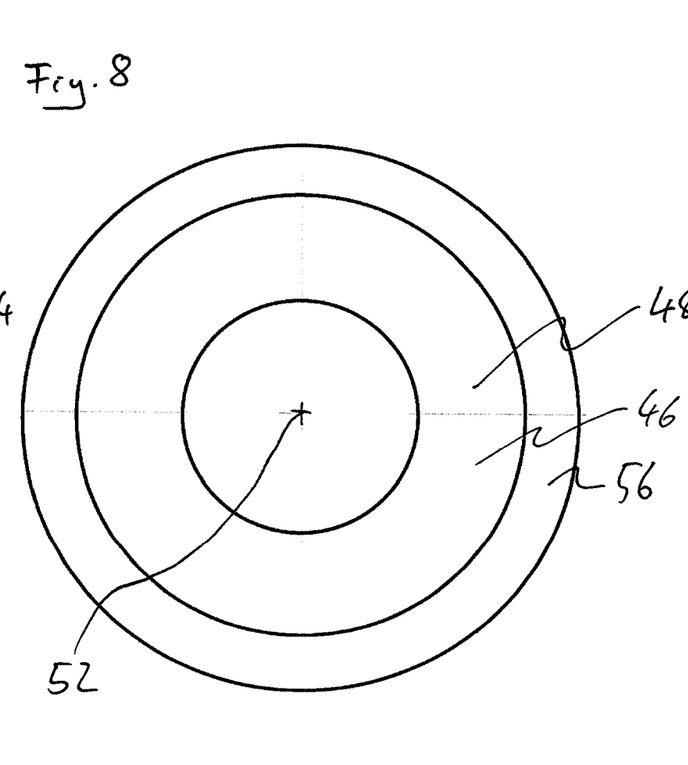
FIG. 8 shows the shank section of the clamping connection when looking in the axial direction.

The method for creating the clamping connection 40 comprises providing the receptacle 44 and the shank section 46. In a further step, at least the contact surface 44 of the receptacle is laser-structured. In this case, a structuring is created having a surface profile that is at least point-symmetrical with respect to a rotation axis 50 of the receptacle 42 (this relates to a section that runs through a plane that runs orthogonal to the rotation axis), but is in particular rotationally symmetrical (the conically shaped contact surface 44 is conically rotationally symmetrical around the axis of rotation 50). The laser structuring has, in particular, linear elevations 54, which are shown in FIG. 7. The radially outward oriented conical contact surface 48 of the shank section 46 is conically rotationally symmetrical about an axis of rotation 52 of the shank section 46.

Figure 5:
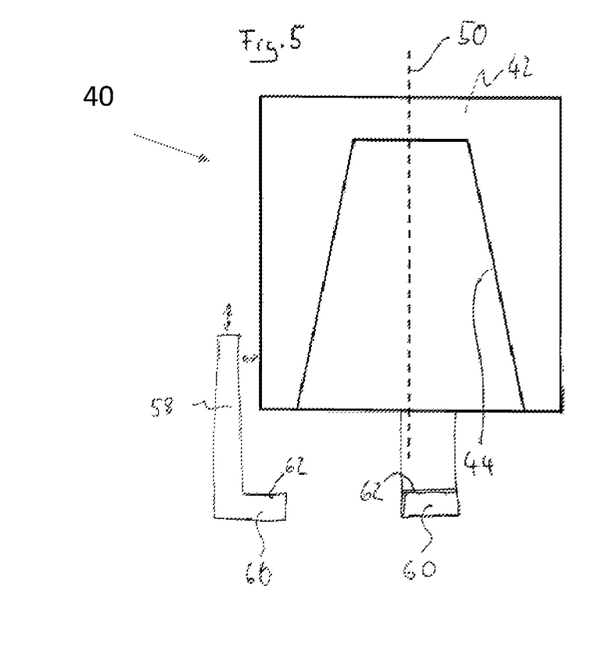
FIG. 5 shows a receptacle of a clamping connection.
Figure 6:
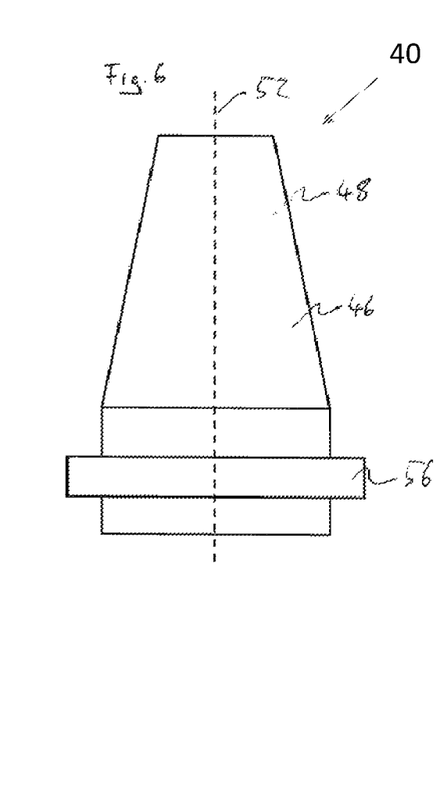
FIG. 6 shows a shank section of a clamping connection.

Following the structuring of the surface of the contact surface 44 of the receptacle 42, a step of non-contact arrangement of the receptacle 42 and the shank section 46 with respect to one another is carried out. The receptacle 42 and the shank section 46 are arranged in the intended radial relative position to one another. This means that, following this arrangement, no relative movement in the radial direction R of the receptacle 42 and the shank section 46 with respect to one another has to be carried out in order to reach the final radial relative position. The axis of rotation 52 of the shank section 46 and the axis of rotation 50 of the receptacle 42 lie on one another.

The clamping connection 40 is then joined. A pressure-stressing contacting of the contact surfaces 44 and 48 is created by a purely axial joining movement. The contact surfaces 44 and 48 are thus moved, pressed, and brought into contact with one another purely in the axial direction during joining. In the joined state, the axis of rotation 52 of the shank section 46 and the axis of rotation 50 of the receptacle 42 are arranged to coincide with the axis of rotation of the clamping connection. The clamping connection 40 preferably has a clamping device 58 which can engage, for example, on a radially projecting projection 56 which is arranged on the shank section 46. For example, this can be realized by one or more element(s) 60 extending from the receptacle 42 to the projection 56 and pulling it into the receptacle 42. For example, the clamping device 58 can have one or more rear grip portions 62 for the form-fitting engagement behind the radially projecting projection 56, via which the shank section 46 can be axially clamped into the receptacle 42. As a result, a clamping between the receptacle 42 and the shank section 46 is reliably realized and maintained. The surface profile of the axially and radially extending elevations 54 is preferably rotationally symmetrical.

Figure 9:
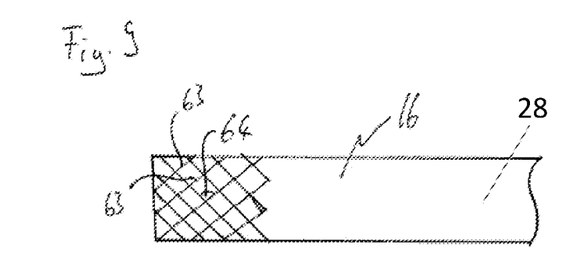
FIG. 9 shows a radially inner component having a radially outer contact surface with a structuring with intersecting lines.

FIG. 9 shows a radially inner component 16 having a radially outer contact surface 28 with a structuring having intersecting lines 63. This structuring allows an advantageous absorption of torques and axial tension or compressive forces. The intersecting lines 63 extend in such a way that the lines enclose an angle 64 which is between 75° and 105°.

Figure 10:
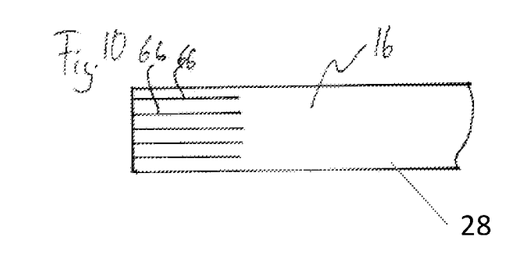
FIG. 10 shows a radially inner component having a radially outer contact surface with a structuring having axially extended lines.

FIG. 10 shows a radially inner component 16 having a radially outer contact surface 28 with a structuring having axially extended lines 63. Such structuring is suitable for absorbing torques.

Figure 11:
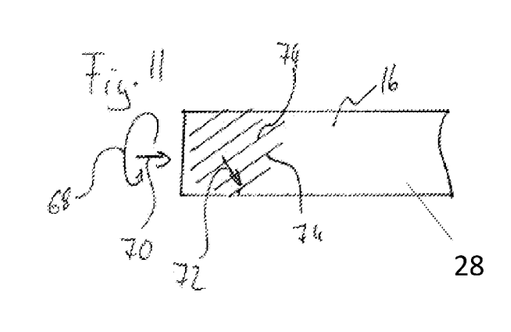
FIG. 11 shows a radially inner component having a press connection arrangement for transmitting a torque and an axial force, which define a resulting force.

FIG. 11 shows a radially inner component 16 having a press connection arrangement for transmitting a torque 68 and an axial force 70, which define a resulting force 72 (projected onto the contact surface 28). The radially inner component 16 includes a structuring having lines 74 extending orthogonally to the resulting force 72.

The invention claimed is:

1. Method for creating a press connection arrangement of two components having an axis of rotation, wherein the axis of rotation extends in an axial direction (A) of the press connection arrangement, and having a radial direction (R) which is orthogonal to the axial direction (A) and a circumferential direction (U) extending in a plane spanned by the orthogonal and the radial direction (R), wherein the press connection arrangement is carried out by creating a non-positive connection by means of a microform connection between a radially inner component with a radially outer contact surface and a radially outer component with a radially inner contact surface, the method comprising the steps of:

providing the inner component with an axially extended and radially outer contact surface which is rotationally symmetrical to an axis of rotation of the inner component;

providing the outer component with an axially extended and radially inner contact surface which is rotationally symmetrical to an axis of rotation of the outer component;

laser structuring at least one of the contact surfaces, wherein a structuring is created having a surface profile that is point-symmetrical with respect to the respective axis of rotation;

non-contact arranging of the inner component and outer component with respect to one another in the intended axial relative position;

joining the press connection arrangement, wherein a pressure-stress contacting of the contact surfaces to each other is carried out by a purely radial joining movement, so that the contact surfaces are pressed purely in the radial direction (R) during joining, wherein in the joined state the axis of rotation of the inner component and the axis of rotation of the outer component coincide with the axis of rotation of the press connection arrangement.

2. Method according to claim 1, wherein the structuring having a surface profile that is rotationally symmetrical to the respective axis of rotation is created during the laser structuring of the at least one contact surface.

3. Method according to claim 1, wherein the outer component comprises at least two macroscopically movable partial sections which, after the non-contact arrangement of the inner component and the outer component to one another in the intended axial relative position are moved towards each other in the radial direction (R) in order to join the press connection arrangement.

4. Method according to claim 1, wherein the outer component is a clamping device.

5. Method according to claim 1, wherein the inner component is a tool shank.

6. Method according to claim 1, wherein the structuring comprises warps, wherein the height of all warps of the structuring does not exceed 25 μm.

7. Method according to claim 1, wherein the structuring comprises line-shaped warps, wherein the line-shaped warps are lines extending in the axial direction (A).

8. Method according to claim 1, wherein the structuring comprises line-shaped warps, the line-shaped warps extending in intersecting lines, wherein the lines form an angle (64) of 75° to 105°.

* * * * *